US005309742A

United States Patent [19]

Lawrence

[11] Patent Number: 5,309,742

[45] Date of Patent: May 10, 1994

[54] LOCKING DEVICE FOR BOAT MOTOR

[76] Inventor: Stephen B. Lawrence, N2166 ParFrey Ville Rd., Waupaca, Wis. 54981

[21] Appl. No.: 954,014

[22] Filed: Sep. 30, 1992

Related U.S. Application Data

[63] Continuation-in-part of Ser. No. 518,848, May 4, 1990, abandoned, which is a continuation-in-part of Ser. No. 106,318, Oct. 8, 1987, abandoned.

[51] Int. Cl.⁵ .................. F16B 41/00

[52] U.S. Cl. .................. 70/232; 70/14; 70/58

[58] Field of Search .................. 70/14, 19, 54-58, 70/178, 229-232, 209-212, DIG. 58

[56] References Cited

U.S. PATENT DOCUMENTS

| | | | |
|---|---|---|---|
| 2,479,300 | 8/1949 | Binz | 70/232 |
| 2,703,501 | 3/1955 | Wooldridge | 70/232 |
| 2,984,096 | 5/1961 | Putman et al. | 70/232 |
| 3,287,943 | 11/1966 | Vaughn et al. | 70/232 X |
| 3,505,839 | 4/1970 | Pavek | 70/232 X |
| 3,693,383 | 9/1972 | Krupen et al. | 70/232 |
| 3,745,797 | 7/1973 | Pavek | 70/232 |
| 3,808,851 | 5/1974 | Kargus et al. | 70/232 |
| 3,943,738 | 3/1976 | Foote | 70/732 |
| 4,030,324 | 6/1977 | Rizio | 70/232 |
| 4,658,607 | 4/1987 | Muse, Jr. et al. | 70/232 X |
| 4,777,809 | 10/1988 | Wiggins | 70/232 |

FOREIGN PATENT DOCUMENTS

| | | | |
|---|---|---|---|
| 1298376 | 6/1962 | France | 70/232 |

*Primary Examiner*—Peter M. Cuomo
*Assistant Examiner*—Suzanne L. Dino
*Attorney, Agent, or Firm*—Ryan, Kees & Hohenfeldt

[57] ABSTRACT

A locking device for locking an outboard motor onto a boat. The locking device includes a housing of greater length than a line formed between the clamping screws holding the motor onto the transom of the boat. A slot is formed in one side of the housing, and is closed on both ends, permitting only transverse sliding application of the housing onto the clamping screws, with the screw handles being received by and confined within the slot. The locking device also includes a padlock, at least one leg of the shackle of that padlock being insertable through a corresponding leg opening formed for that purpose in the housing. The leg opening is positioned so that the handles are thereby trapped in the slot. The padlock thereby locks the shackle into the body so as to impede unauthorized removal of the housing from the clamping screws, thus forming a stop to prevent sliding removal of the housing from the screws.

9 Claims, 1 Drawing Sheet

LOCKING DEVICE FOR BOAT MOTOR

CROSS REFERENCE TO RELATED APPLICATION

This application is a continuation-in-part of application Ser. No. 07/518,848, filed May 4, 1990, which in turn was a continuation-in-part of application Ser. No. 07/106,318, filed Oct. 8, 1987 both now abandoned.

BACKGROUND OF THE INVENTION

This invention relates to locking devices for outboard motors, and more specifically to locking devices to prevent the theft of the motor by preventing the loosening of the clamping screws which secure the motor to the transom board of a boat or a motor stand used in sales and/or servicing of motors.

Numerous devices have been proposed in the past to inhibit or curb the theft of outboard motors attached to and used in connection with private boats. For instance, Foote, U.S. Pat. No. 3,943,738 provides a relatively thin-walled housing which is greater in length than the distance between the two clamping screws, and slid endwise onto the screw heads. A padlock is then provided to prevent the housing from being slid off the screw heads.

Similarly, Wiggins, U.S. Pat. No. 4,777,809, discloses a particular adaptation of the thin-walled housing of Foote, specially designed for those motors that have substantially rounded heads or knobs with notches or recesses formed in those knobs. Wiggins provides special stops shaped to mate with the recesses of those knobs.

This invention relates to improvements to the apparatus described above, and to solutions to some of the problems raised or not solved thereby.

SUMMARY OF THE INVENTION

The present invention is directed to a locking device for locking an outboard motor onto a boat. Generally these motors include clamps for securing the motor to the boat. These clamps include transversely spaced apart clamping screws threaded through the clamps for securing the clamps to the boat. According to the invention, the locking device includes a housing of greater length than a line formed between the clamping screws, with a slot formed in one side of the housing. The slot is closed on both ends, and permits only transverse sliding application of the housing onto the screws, with the heads or handles of the clamping screws being received by and confined within the slot. The invention further provides a padlock, at least one leg of the shackle of that padlock being insertable through a corresponding leg opening formed for that purpose in the housing. The leg opening is positioned so that the handles are thereby trapped in the slot. The padlock thereby locks the shackle into the body so as to impede unauthorized removal of the housing from the screws, the padlock thus forming a stop to prevent sliding removal of the housing from the screws. In one embodiment the slot is positioned substantially centrally with respect to the length of the housing. The leg openings may be positioned substantially centrally with respect to the length of the slot. It is common for the shackle of a padlock to have two legs, and if so the housing will have a matching number of openings.

Other objects and advantages of the invention will become apparent hereinafter.

DESCRIPTION OF THE PREFERRED EMBODIMENT

Figure 1:
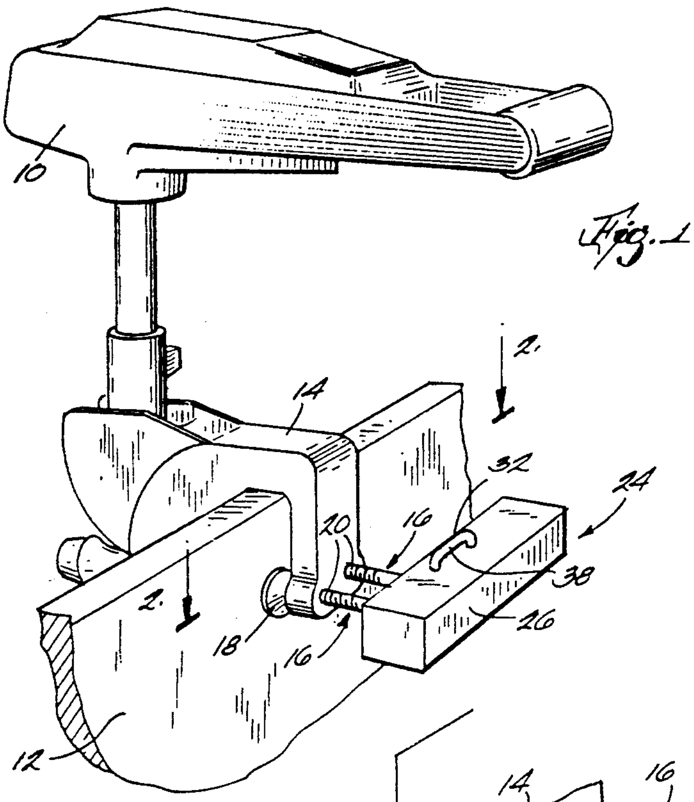
FIG. 1 is a perspective view of an outboard motor attached to a boat, and locked thereon by a locking device constructed according to a preferred embodiment of the invention.

Referring now to FIG. 1, there is shown an outboard motor 10 mounted to a support 12. The outboard motor shown gives the general appearance of a trolling motor, and the invention may be particularly well suited to application to such a trolling motor, because of the compact size of the embodiment shown. The invention is not, however, intended to be limited to the attachment of a trolling motor, but rather includes any outboard motor being affixed in the same manner as that shown for motor 10. Support 12 may be the transom of a boat (not shown), or it could be a motor stand used in sales and/or servicing of motors.

Figure 3:
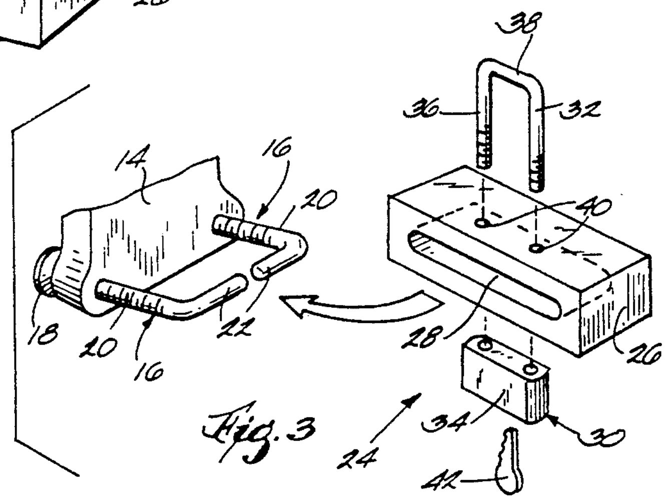
FIG. 3 is an exploded perspective view of a locking device according to the embodiment shown in the other figures.
Figure 2:
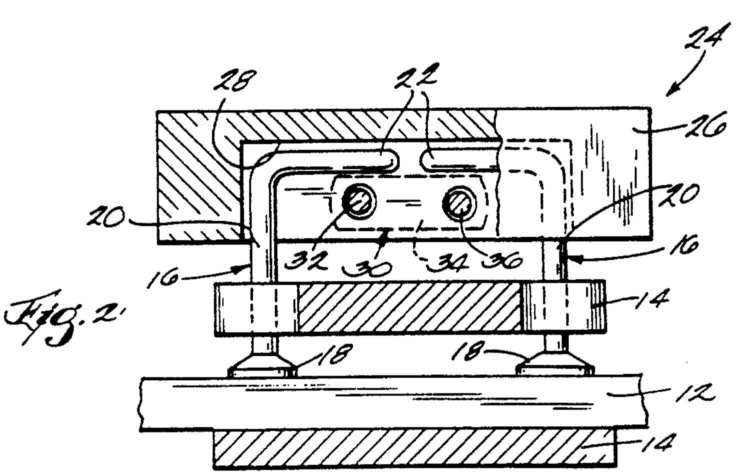
FIG. 2 is a cross-sectional view of the embodiment shown in FIG. 1, taken generally along line 2—2.

It is conventional for motor 10 to be mounted to support 12 by means of C-shaped mounting bracket 14, through which are threaded a pair of clamp securing members or clamping screws 16. Each of the clamping screws 16 has a foot bearing pad 18 for engaging the support 12. Referring to FIGS. 2 and 3, each clamping screw 16 also has a threaded shank 20 and a head or handle 22 on the end of the screw opposite the pad 18. The handles 22 are generally L-shaped, giving the user leverage to exert force and rotate the screws 16 into or out of engagement with the support 12.

The invention provides a locking device 24 to be applied to clamping screws 16, to inhibit unauthorized access to the screws, and thus help prevent theft of the motor 10. According to the invention, the locking device includes a housing 26 of greater length than a line formed between the clamping screws 16. The housing 26 has a slot 28 formed in one side thereof, the slot being closed on both ends. Preferably the slot is located generally centrally within the housing 26. Locking device 24 also includes a padlock 30, having a shackle 32 and a body 34. As shown best in FIG. 3, shackle 32 has at least one leg 36 insertable into and completely removable from the body 34, and a transverse portion 38. While the drawing figures show a shackle 32 with two legs 36, a single leg would also yield similar properties. The housing 26 includes leg openings 40, one for each of the legs 36 of the shackle 32, formed entirely through the housing 26, transverse to the slot 28. The leg openings 40 are positioned substantially centrally with respect to the length of the slot. While the lock body 34 shown is of the type opened with a key 42, a combination lock would be equally applicable. The lock body 34 includes means therein to lock the shackle 32 so that the latter is not removable without the correct key 42, or the correct combination if padlock 30 is of that type.

To use the locking device 24, the handles 22 are first arranged so that they form a single line. So as to keep the locking device 24 as compact as possible, it is best to arrange the handles 22 so as to point to each other. Once the handles 22 are so arranged, the housing 26 is slid, onto the clamping screws 16, endwise with respect to the screws and transversely with respect to the housing, with the handles 22 being received by the slot 28 and thereby confined within the housing. Once the handles 22 are as far as possible into the slot 28, the legs 36 of shackle 32 are slid into and entirely through the leg openings 40, to protrude out the opposite side. Thereafter, the lock body 34 is engaged with the shackle legs 36. As can be seen from FIG. 2, the leg openings are positioned so that, when the shackle 32 is in the housing 26, the handles 22 are trapped inside the slot 28 so that the locking device 24 may not easily be removed, and the screws 16 accessed or turned, without the proper key or combination. Thus the padlock 30, or more specifically the shackle 32, forms a stop to prevent sliding removal of the housing 26 with respect to the screws 16.

The entire housing 26 may be covered with plastic, rubber or some other non-abrasive coating to reduce corrosion, and damage upon application of the device to the screws. The housing 26 is preferably machined from a solid block of material, with slot 28 and leg openings 40 being machined therein. This construction results in a very secure locking function, and it would be practically impossible to remove the housing 26 without severely damaging the screws 16 or the motor 10 itself, much more secure than prior art locking devices having the slot reaching all the way to the end of the housing.

Alternatively, housing 26 may be forged or otherwise formed of hollow stock, with the slot 28 and leg openings 40 formed thereafter as part of the process. Housing 26 could even be cast with the slot 28 and leg openings 40 formed simultaneously.

While the apparatus hereinbefore described is effectively adapted to fulfill the aforesaid objects, it is to be understood that the invention is not intended to be limited to the specific preferred embodiment of locking device for boat motor set forth above. Rather, it is to be taken as including all reasonable equivalents within the scope of the following claims.

I claim:

1. In combination:

a support;

clamps for an outboard motor-carrying bracket;

transversely spaced apart clamp securing screws for securing said clamps to said support, each clamp securing screw having a head and a shank;

a one-piece housing of greater length than a line extending between said clamp securing members, said one-piece housing having a single, continuous slot formed in one side thereof, said slot being closed on both ends, to permit transverse sliding application of said housing axially onto said securing screws, with the heads of the latter being received by said housing slot and confined within said housing without the requirement of any swinging or sideways sliding of the housing or rotation of the screws;

a padlock, including a shackle and a body, said shackle having at least two legs and said body having means for locking said shackle legs therein;

at least one of the legs of said shackle being insertable through at least one leg opening formed for that purpose in said housing and into said body, said at least one leg opening being positioned so that said heads are trapped in said slot by said padlock.

2. A combination as recited in claim 1 wherein said slot is positioned substantially centrally with respect to the length of said housing.

3. A combination as recited in claim 2 wherein said leg openings are positioned substantially centrally with respect to the length of said slot.

4. A combination as recited in claim 1 wherein said housing is machined from a solid block of material, said slot and said openings being machined therein.

5. A locking device for locking an outboard motor onto a support, said motor including clamps for securing said motor to said support, said clamps including transversely spaced apart clamping screws for securing said clamps to said support, each clamping screw having a handle and a threaded shank, said locking device comprising:

a one-piece housing of greater length than a line extending between said clamping screws, said housing having a single, continuous slot formed in one side thereof, said slot being closed on both ends and permitting transverse sliding application of said housing axially onto said screws with said handles being received by said housing slot and confined within said housing without the requirement of any swinging or sideways sliding of the housing or rotation of the screws;

a padlock, including a shackle and a body, said shackle having at least one leg and a transverse portion, and being lockable into said body;

said at least one leg of said shackle being insertable through at least one leg opening formed for that purpose in said housing, said at least one leg opening being positioned so that said heads are trapped in said slot by said padlock.

6. A locking device as recited in claim 5 wherein said slot is positioned substantially centrally with respect to the length of said housing.

7. A locking device as recited in claim 6 wherein said leg openings are positioned substantially centrally with respect to the length of said slot.

8. A locking device as recited in claim 7 wherein said shackle has at least two legs.

9. A locking device as recited in claim 8 wherein said shackle forms said stop to prevent sliding removal of said housing with respect to said screws.

* * * * *